United States Patent [19]

Yamamoto et al.

[11] Patent Number: 4,534,108
[45] Date of Patent: Aug. 13, 1985

[54] ELECTRIC CAN OPENER WITH JUICE SQUEEZING ATTACHMENT

[75] Inventors: Osamu Yamamoto, Nagoya; Senichiro Norizuki, Aichi, both of Japan

[73] Assignee: Kabushikikaisha Aichidenkikosakusho, Japan

[21] Appl. No.: 528,914

[22] Filed: Sep. 2, 1983

[30] Foreign Application Priority Data

Sep. 6, 1982 [JP] Japan ................. 57-154898

[51] Int. Cl.$^3$ ............ B25F 3/00; B67B 7/38; A47J 19/02
[52] U.S. Cl. .................... 7/152; 30/419; 30/423; 30/123; 99/502
[58] Field of Search .......... 7/152, 158, 170, 156, 7/110, 113; 30/123, 416–420, 423, 421; 99/501, 502

[56] References Cited

U.S. PATENT DOCUMENTS

| | | | |
|---|---|---|---|
| 3,487,542 | 1/1970 | Hamwi et al. | 30/419 |
| 3,575,223 | 4/1971 | Hickel et al. | 99/501 |
| 3,635,270 | 1/1972 | Petroske et al. | 30/123 R |
| 3,689,999 | 9/1972 | Swanke et al. | 30/419 |
| 3,757,416 | 9/1973 | Yamamoto | 30/419 |
| 4,240,338 | 12/1980 | McClean | 99/501 |

FOREIGN PATENT DOCUMENTS

| | | | |
|---|---|---|---|
| 2919605 | 11/1979 | Fed. Rep. of Germany | 99/501 |
| 2399226 | 4/1979 | France | 99/501 |

Primary Examiner—Roscoe V. Parker
Attorney, Agent, or Firm—William A. Drucker

[57] ABSTRACT

An electric can opener comprises a can opener body, a can opening attachment and a juice squeezing attachment. The can opener body is provided with a drive shaft, a motor for rotating said drive shaft, a vertically holding portion and a horizontally holding portion. When the vertically holding portion is utilized to set the can opener body, the drive shaft assumes a horizontal condition. A horizontal rotating shaft provided on the can opening attachment can be brought into engagement with the drive shaft in the horizontal condition. Accordingly, the can opening attachment is utilized to cut out a lid of a can. On the other hand, when the horizontal holding portion is utilized to set the can opener body, the drive shaft assumes a vertical condition. A vertical rotating shaft provided on the juice squeezing attachment can be brought into engagement with the drive shaft in the vertical condition. Accordingly, the juice squeezing attachment can be utilized to squeeze fruit juice of citrus fruits.

4 Claims, 31 Drawing Figures

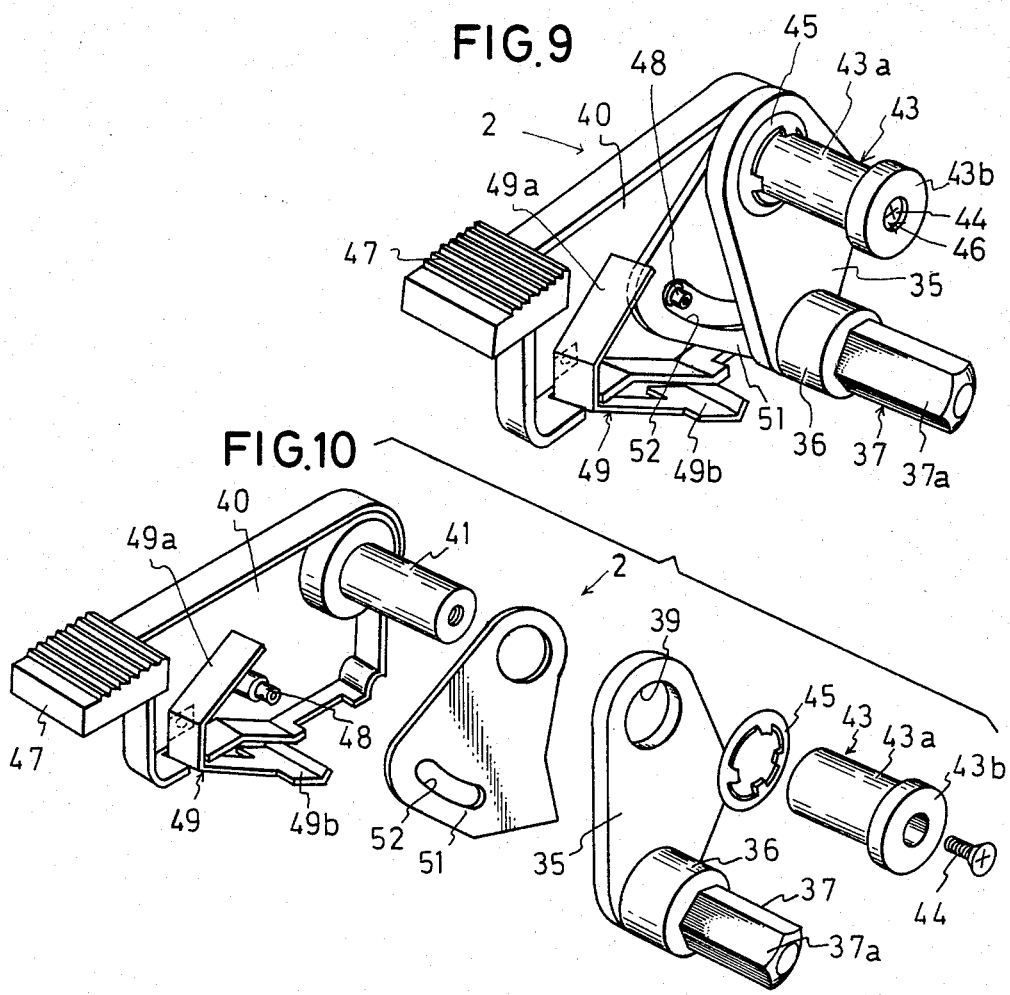
FIG. 9
FIG. 10
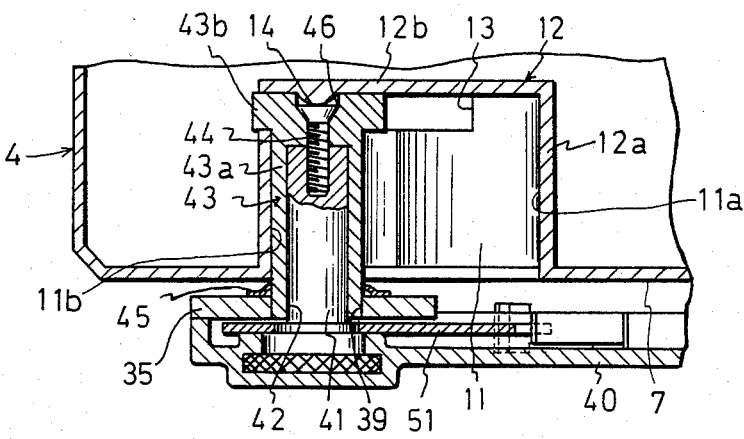
FIG. 11

ELECTRIC CAN OPENER WITH JUICE SQUEEZING ATTACHMENT

BACKGROUND OF THE INVENTION

1. Field of the Invention

This invention relates to an electric can opener used to cut out a can for various canned goods.

2. Description of the Prior Art

An electric can opener conventionally used in a kitchen is very useful because a can lid can be cut out easily by a drive force of a motor. In cooking in the kichen, it is sometimes necessary to use the squeezed juice of citrus fruits such as a lemon. In this case, a fruit juice squeezer will come in handy when provided. However, the provision of an exclusive-use fruit juice squeezer only for such a purpose requires much cost and is uneconomical. Also, there involves an inconvenience in that an extra space for storing the squeezer when not used is required.

SUMMARY OF THE INVENTION

An object of the present invention is to provide an electric can opener in which a can lid can be cut out by a turning force of a motor.

That is, in the electric can opener according to the present invention, a horizontal rotating shaft provided on a can opening attachment is rotated while maintaining its horizontal condition by a motor mounted on a can opener body.

A can feed gear is mounted on one end of said rotating shaft in the horizontal condition. An ear of a can is placed on the can feed gear and a cutter is cut into the can lid. Then the can lid is turned within a substantially horizontal plane by the rotation of the can feed gear. The can lid is cut out by the cutter while the can is being turned.

Another object of the invention is to provide an electric can opener in which the juice of citrus fruits such as a lemon can be also squeezed by the turning force of the motor.

That is, in the electric can opener according to the present invention, a vertical rotating shaft provided on a juice squeezing attachment is rotated while maintaining its vertical condition by a motor provided on a can opener body. Mounted on the upper end of the rotating shaft is a juice squeezing body which is rotated together with the rotating shaft in the vertical condition. When citrus fruits such as a lemon are pressed against the juice squeezing body, flesh of the citrus fruits is mashed by the rotating juice squeezing body to squeeze out juice. The juice flows down and stays within a squeezed juice pan in the horizontal condition.

Yet a further object of the invention is to provide an electric can opener in which, even a construction wherein cutting-out of a can lid is accomplished by a can opening attachment and juice-squeezing is accomplished by a juice squeezing attachment, that is, even a construction wherein the attachments are utilized to perform two kinds of work which are totally different from each other, these attachments can be operated by a single can opener body.

That is, in accordance with the present invention, the can opener body comprises a vertically holding portion and a horizontally holding portion. Thus, the can opener body is provided with only one drive shaft, which can be used in two different modes. These two different modes of use are selected so that the aforesaid two kinds of work may be carried out.

More specifically, when the vertically holding portion is utilized to set the body, the drive shaft exposed to the work surface assumes a horizontal condition. The horizontal rotating shaft in the aforementioned can opening attachment can be brought into engagement with the drive shaft placed in the horizontal condition as described. Under such a condition, the aforementioned cutting-out work of a can lid can be carried out. On the other hand, when the horizontally holding portion is utilized to set the body, the drive shaft exposed to the work surface assumes a vertical condition. The vertical rotating shaft in the aforementioned juice squeezing attachment can be brought into engagement with the drive shaft placed in the vertical condition as described. Under such a condition, the aforementioned juice squeezing work of citrus fruits can be carried out.

Even a construction wherein two kinds of work can be done as described above, if such work can be carried out by making use of a single can opener body, less expense as a whole results, which is economical. Besides, where the can opener is stored on the shelf or the like when not in use, even one which can perform two kinds of work as described above can be stored in a considerably narrower space than a space required to store two devices. Furthermore, the can opener body merely has a single drive shaft, and therefore, its construction, that is, a construction from the motor to the drive shaft is possible to make simple. This is effective to miniaturize the body and reduce the weight thereof.

Other objects and advantages of the invention will become apparent during the following discussion of the accompanying drawings.

BRIEF DESCRIPTION OF THE DRAWINGS

FIG. 9 is a perspective view of the can opening attachment;

FIG. 10 is an exploded perspective view of the can opening attachment;

FIG. 11 is a cross sectional view showing a state wherein a mounting shaft is mounted on a mounting hole;

DESCRIPTION OF THE PREFERRED EMBODIMENTS

A first embodiment will now be described with reference to FIGS. 1 through 21, which show a hand-held electric can opener.

Figure 1:
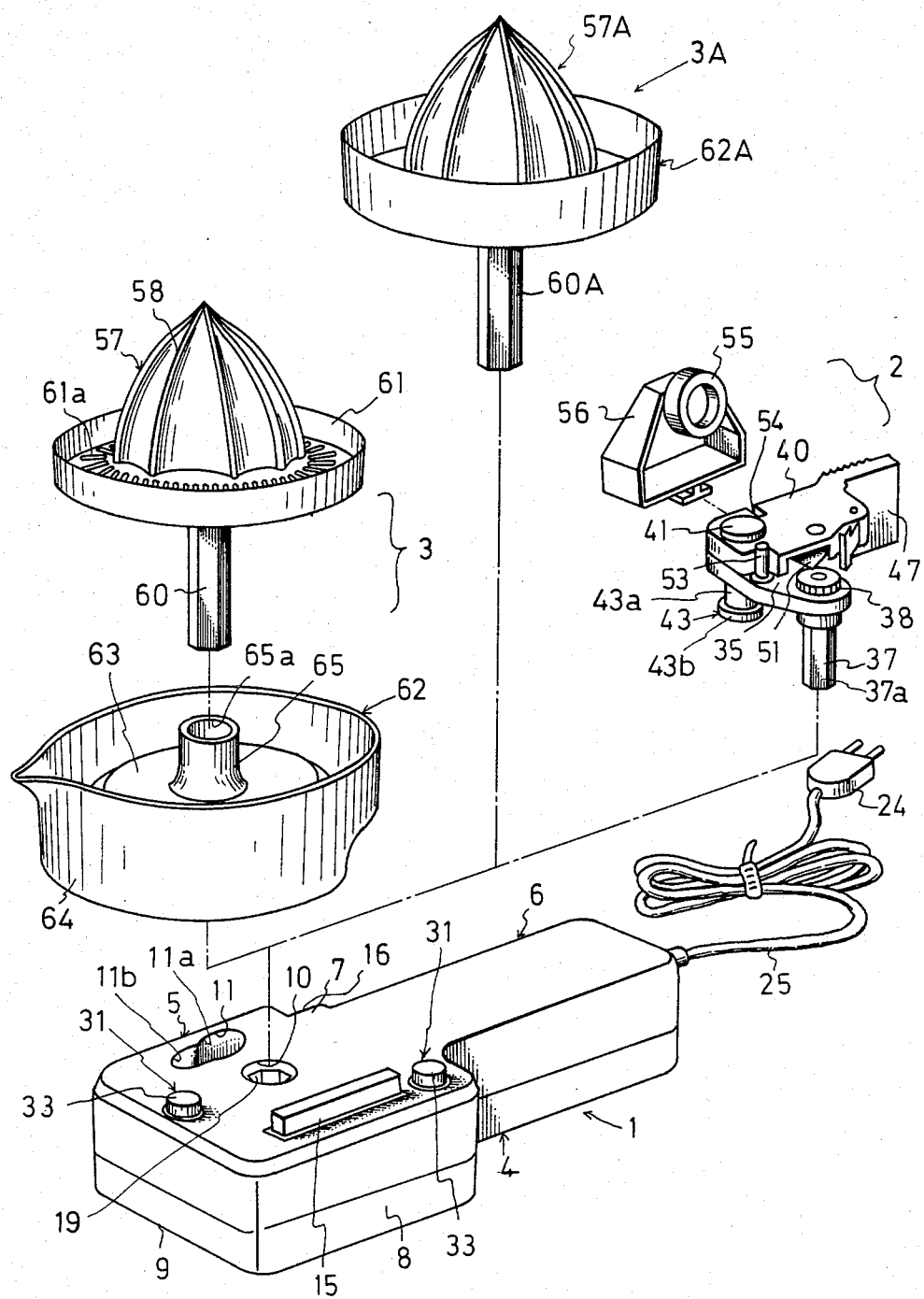
FIG. 1 is an exploded perspective view showing a first embodiment of an electric can opener.
Figure 2:
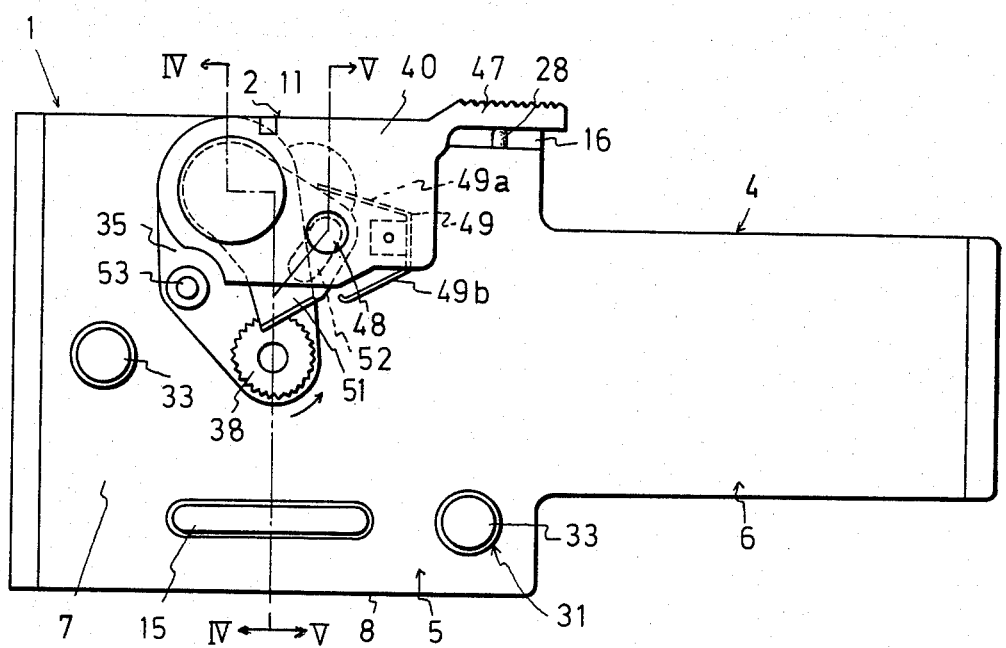
FIG. 2 is a front view showing a state wherein a can opening attachment is attached to a can opener body in the can opener of FIG. 1.
Figure 3:
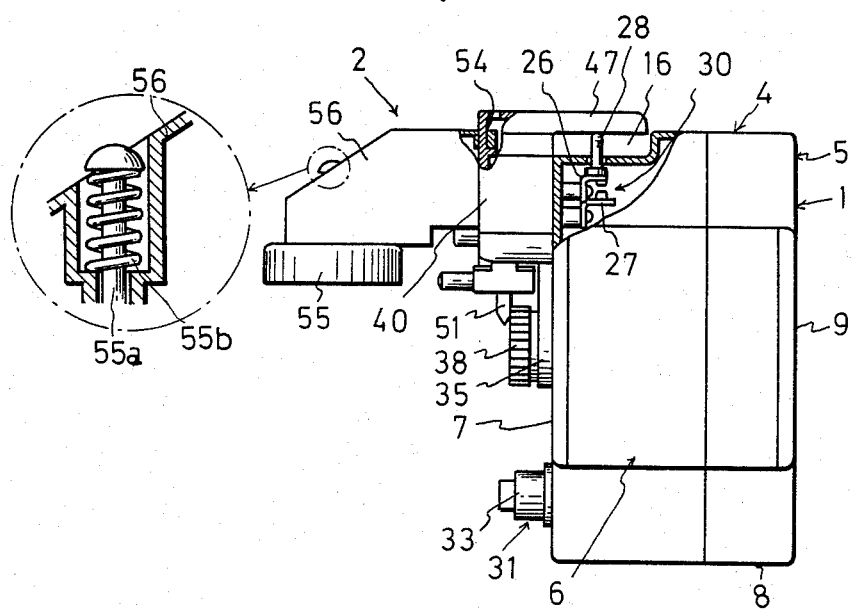
FIG. 3 is a side view with a part broken.
Figure 4:
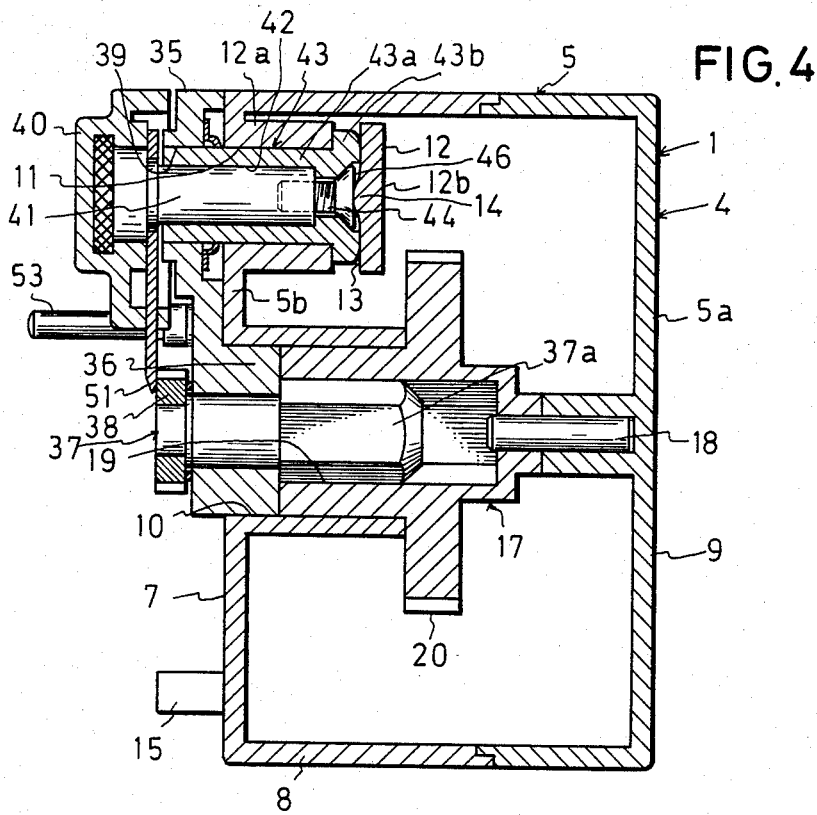
FIG. 4 is a sectional view taken along the line IV—IV of FIG. 2.
Figure 5:
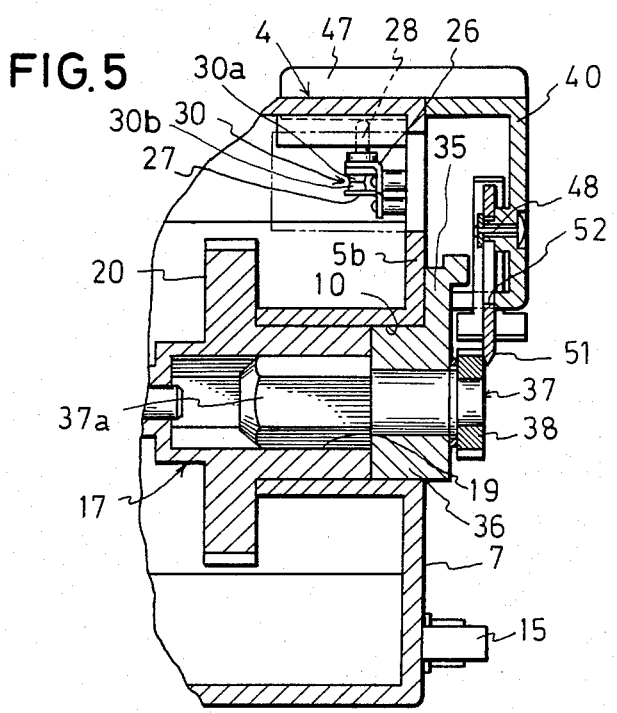
FIG. 5 is a sectional view taken along the line V—V of FIG. 2.
Figure 6:
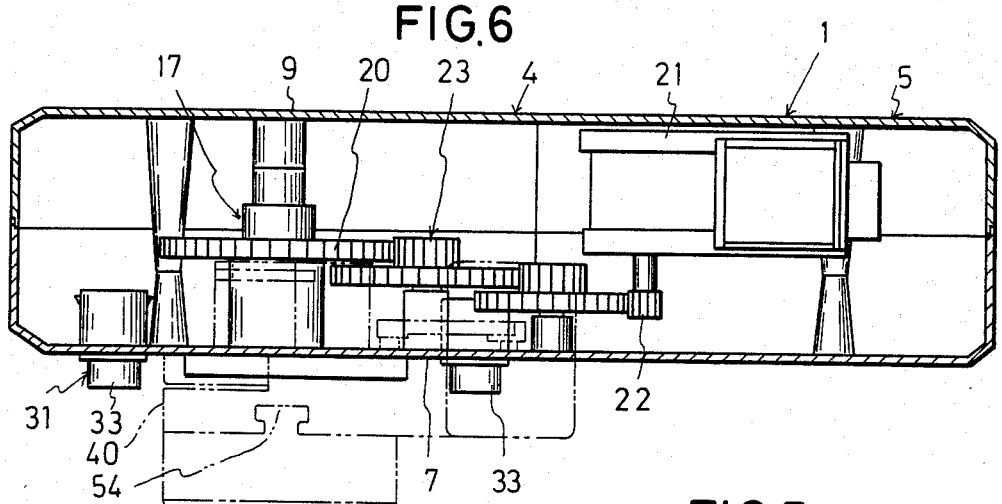
FIG. 6 is a cross sectional view of a can opener body.
Figure 8:
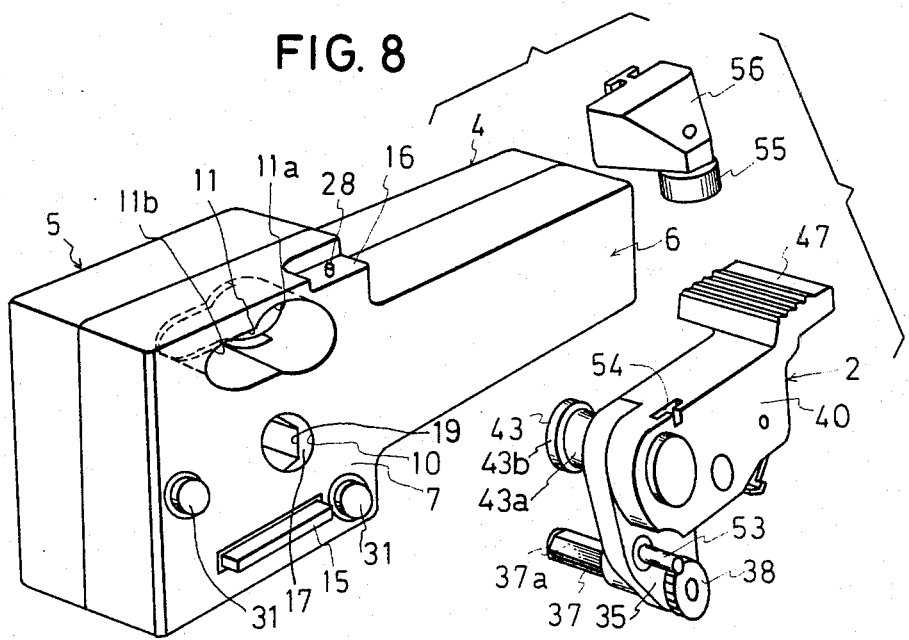
FIG. 8 is an exploded perspective view showing the relation of the can opener body and the can opening attachment.
Figure 12:
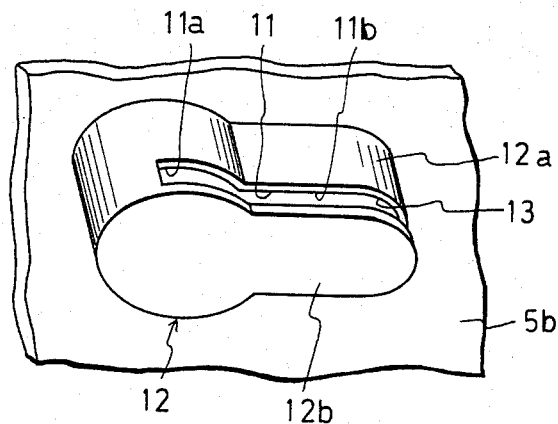
FIG. 12 is a perspective view showing a portion of the mounting hole portion.
Figure 16:
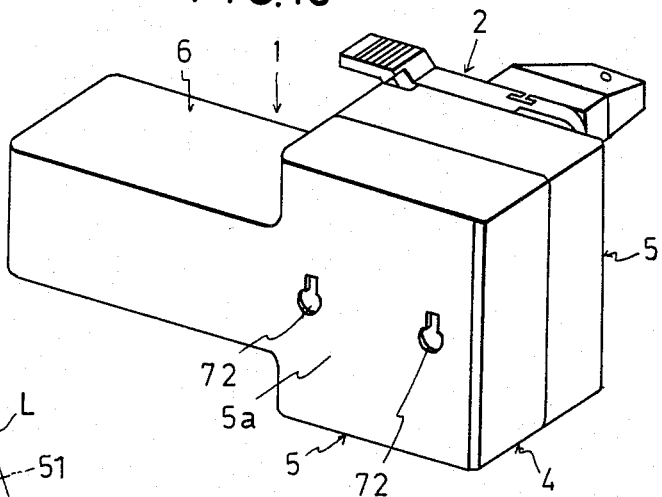
FIG. 16 is a perspective view showing a back side of an electric can opener.
Figure 18:
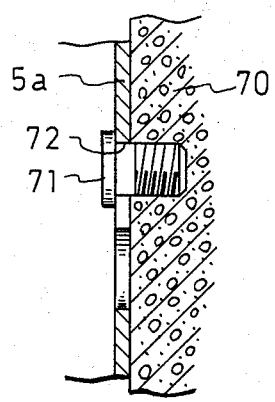
FIG. 18 is a longitudinal sectional view showing a hanging portion of FIG. 17.

The electric can opener is composed of a can opener body 1, a can opening attachment 2 and a juice squeezing attachment 3, as shown in FIG. 1. First, the can opener body 1 will be described. This can opener body 1 is provided with a hollow housing 4 formed of plastic as shown in FIGS. 1 through 5. This housing 4 is composed of a box-like work portion 5 and an elongated hand-hold portion 6. This work portion 5 is formed with a flat work surface 7, a vertically holding portion 8 capable of holding the work surface 7 substantially in a vertical condition and a horizontally holding portion 9 capable of holding the work surface 7 upwardly and substantially in a horizontal condition. The work portion 5 has a back wall 5a formed with hanging holes 72 adapted to be hung on hanging bolts 71 mounted on a wall 70 or the like of a building as shown in FIGS. 16 and 18. The work surface 7 is formed in the vicinity of a center thereof with a support hole 10 and formed at an upper position deviated from the support hole 10 with a mounting hole 11 as shown in FIGS. 4 and 5. This mounting hole 11 is composed of a large diameter hole portion 11a having a diameter larger than a large diameter portion of a mounting shaft which will be described hereinafter and a small diameter hole portion 11b having a diameter larger than a small diameter portion of the mounting shaft but smaller than a larger diameter portion thereof, as shown in FIG. 8. The mounting hole 11 is formed into a recess portion 12 which is formed by recessing a portion of the housing 4 as shown in FIGS. 11 and 12. The recesss portion 12 has a side wall 12a formed with a notched hole 13. This notched hole is positioned at the deeper portion of the small diameter hole portion 11b. The notched portion 13 is formed into a shape capable of being fitted in a large diameter portion of a mounting shaft which will be described hereinafter. The recess portion 12 has a bottom wall 12b formed in a portion corresponding to the center of the small diameter hole portion 11b with a stop portion 14 so as to be projected. The work surface 7 has a can support 15 at the lower portion of the support hole 10 and is formed with a locking recess portion 16 in a corner of an upper end thereof.

Figure 7:
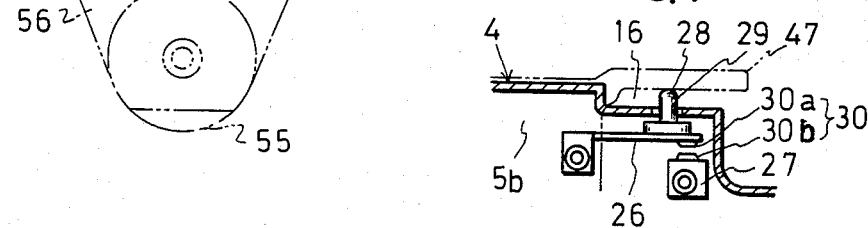
FIG. 7 is a sectional view of a power source switch portion.
Figure 19:
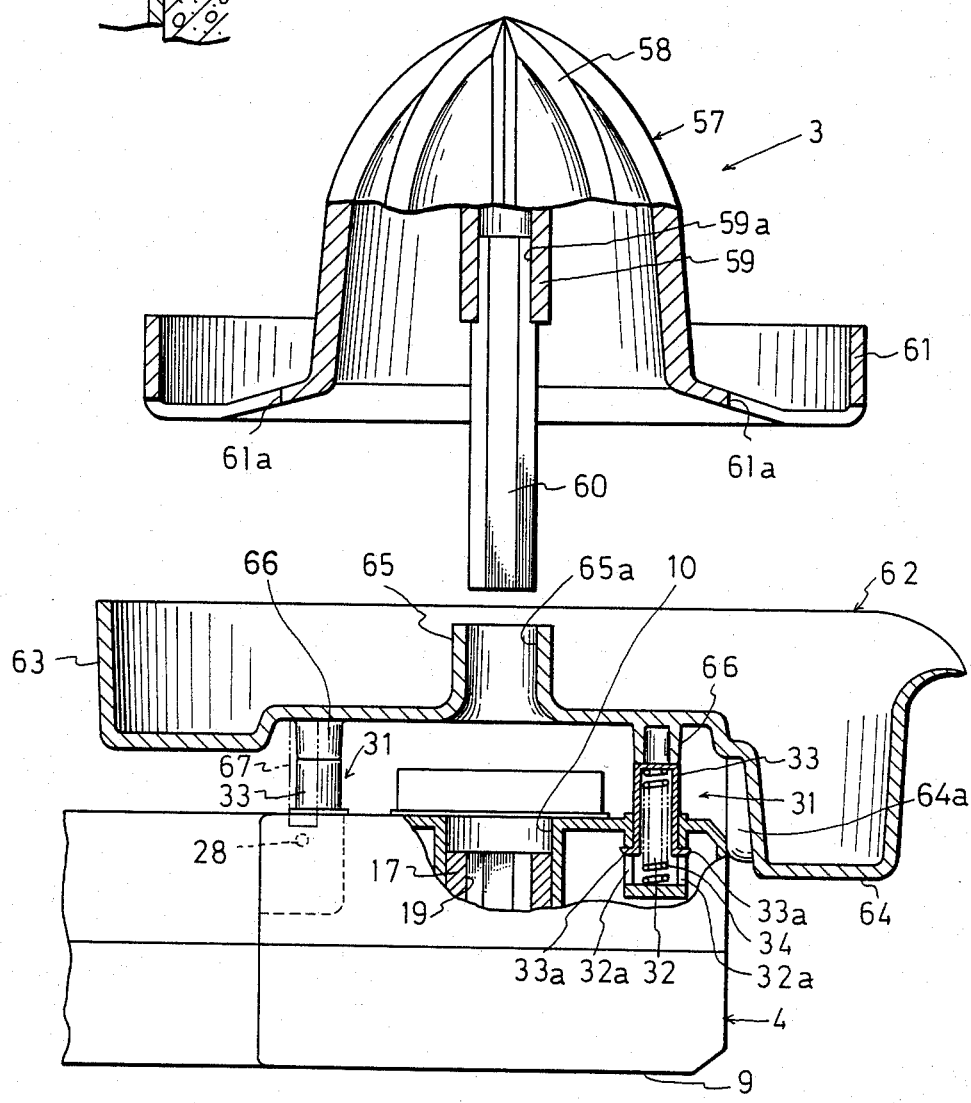
FIG. 19 is a front view showing the relation of the can opener body and the juice squeezing attachment with a part shown in section.

The support hole 10 has a drive shaft 17 rotatably fitted therein as shown in FIG. 4. A rear end of the drive shaft 17 is rotatably supported by a pin 18 supported on the back wall 5a, and a front end thereof is formed with a hexagonal engaging hole 19. The drive shaft 17 is integrally formed in its outer circumference with a gear 20. This gear 20 is in meshing engagement with a gear 22 of a drive motor 21 housed within the housing 4 through a reduction gear device 23. Connected to the drive motor 21 through a switch 30 is a power source cord 25 having a plug 24 at a forward end thereof. Accordingly, a motor 21 can be driven by a power source for home use. A movable piece 26 and a fixed piece 27 are disposed within the housing 4 in the vicinity of the locking recess portion 16, as shown in FIGS. 5 and 7. The movable piece 26 has one end attached to the front wall 5b. The movable piece 26 is formed from a spring plate. The fixed piece 27 is likewise attached to the front wall 5b. These movable piece 26 and the fixed piece 27 are disposed opposedly each other. A push button 28 is secured to the forward end and the push button 28 is projected into the locking recess portion 16 from an aperture 29 formed in the upper surface wall of the locking recess portion 16. Contacts 30a and 30b which constitute a power source switch 30 of the drive motor 21 are mounted on opposed surfaces of the forward end of the movable piece 26 and the fixed piece 27, respectively. When the push button 28 is depressed, the contacts 30a and 30b come into contact with each other. The work surface 7 of the housing 4 is further provided with support means 31 capable of resiliently supporting the juice squeezing attachment 3 which will be described hereinafter as shown in FIGS. 8 and 19. The support means 31 are provided at two places of the work surface 7. Each of the support means 31 is composed of a receiving recess portion 32 formed in the work surface 7 into a recessed configuration, a support body 33 formed of plastic partly fitted into the receiving recess portion 32 and a support spring 34 for biasing the support body 33 outwardly of the receiving recess portion 22. The receiving recess portion 32 has a side wall formed with guide slots 32a and 32a. Fitted into these guide slots 32a and 32a are leg pawls 33a and 33a, respectively, integrally formed on the end of the support body 33. These leg pawls 33a and 33a are engaged with ends of the guide slots 32a and 32a, respectively, whereby the support body 33 is prevented from being slipped away from the receiving recess portion 32.

Next, the aforementioned can opening attachment 2 will be described. First, the can opening attachment 2 is provided with a base plate 35 as shown in FIGS. 9 and 10. The base plate 35 is formed in the side at one end thereof with a bearing portion 36. This bearing portion 36 is rotatably fitted in the support hole 10 of the work surface 7, as shown in FIG. 4. A rotating shaft 37 is rotatably carried on the bearing portion 36. One end of the rotating shaft 37 is formed in an engaging shaft portion 37a which is hexagonal in section engageable with the engaging hole 19 of the drive shaft 17, and a can feed gear 38 is secured to the other end of the rotating shaft 37. The gear support plate 35 is formed at the other end with an aperture 39. The can opening attachment 2 is also provided with a cutter operating plate 40 and a mounting shaft 43, which are formed of plastic. A shaft 41 for connection is mounted on the cutter operating plate 40. Mounting is achieved by embedding a head of the shaft 41 into the operating plate 40. On the other hand, the mounting shaft 43 is formed to be hollow and has a fitting hole 42 therein. The associated structure of the base plate 35, the mounting shaft 43 and the cutter operating plate 40 are as shown in FIGS. 4 and 11. That is, the mounting shaft 43 is rotatably inserted into the aperture 39 of the base plate 35. The shaft 41 is inserted into the fitting hole 42 of the mounting shaft 43. The mounting shaft 43 and the shaft 41 are integrally fixed by a mounting screw 44. Further, a stop ring 45 is snapped on the mounting shaft 43 to prevent the mounting shaft 43 from movement in a direction of the axis with respect to the base plate 35. The mounting shaft 43 is composed of a small diameter portion 43a and a large diameter portion 43b and can be locked at the mounting hole 11 of the work surface 7. The mounting shaft 43 is formed in the forward end with an engaging recess 46. A can keep member 53 is projected on the side of the can feed gear 38 of the base plate 35, as shown in FIGS. 1 and 8. The cutter operating plate 40 is formed with a switch operating portion 47 opposed to the engaging recess portion 16 of the housing 4, as shown in FIGS. 2 and 3. This switch operating portion 47 is received by the push button 28. A pin 48 is planted on the back of the cutter operating plate 40. An intermediate portion of a plate spring 49 approximately in the shape of is also secured to the back of the cutter operating plate 40. An upper end 49a of the plate spring 49 downwardly biases a cutter which will be described hereinafter and a lower end 49b thereof downwardly holds an ear 50a of a can 50 when the can is opened. A cutter 51 is rotatably mounted on the shaft 41. This cutter 51 is formed with a slot 52, into which is inserted said pin 48. The upper end of the slot 52 in the cutter 51 is brought into abutment with the pin 48 by the upper end 49a of the plate spring 49. The cutter operating plate 40 is formed at its upper portion with a dovetail groove 54, and an arm 56 for supporting a magnet 55 is detachably fitted in the dovetail groove 54, as shown in FIGS. 3 and 8. The magnet 55 is mounted movably up and down on the arm through a mounting lever 55a and is normally biased upwardly by means of a spring 55b.

Figure 21:
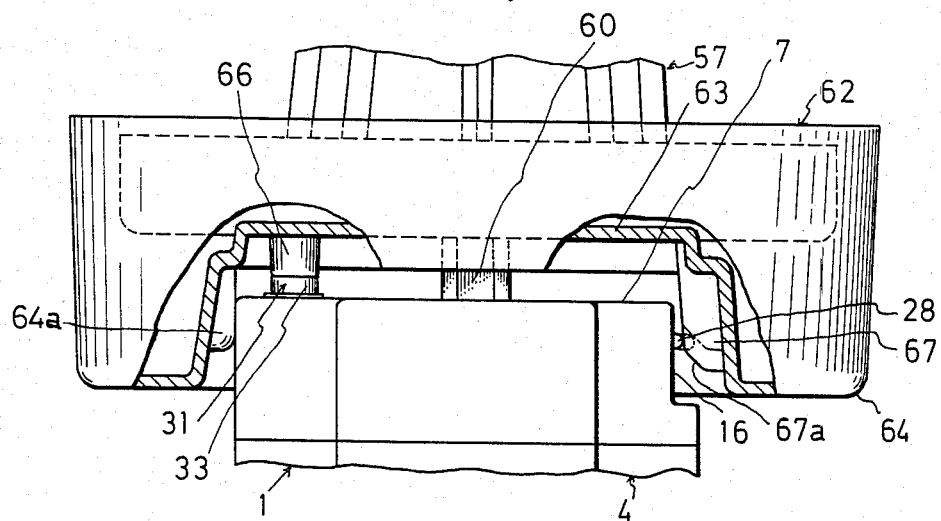
FIG. 21 is a partial view showing the neighbourhood of a switch operating portion of the juice squeezing attachment.

Next, the aforementioned juice squeezing attachment 3 will be described. First, the juice squeezing attachment 3 is provided with a juice squeezing body 67 in the shape of a hanging bell as shown in FIGS. 1 and 19. A number of lateral projected strips 58 are formed in the outer circumference of the juice squeezing body 57 so that citrus fruits may be squeezed. The juice squeezing body 57 is further integrally formed in its internal central portion with a fitting member 59 to be projected. The fitting member 59 has a fitting hole 59a, and an upper end of a rotating shaft 60 is snapped in said fitting hole 59a. This rotating shaft 60 is formed to have a hexagon in section so that a lower end thereof may engage the engaging hole 19 of the drive shaft 17. The juice squeezing body is further integrally formed at its lower end with a filtering plate 61 for filtering juice squeezed by the juice squeezing body 57. This filtering plate 61 has a bottom surface formed into the shape of a plane circular plate, and said bottom surface is formed with a number of fine filtering grooves 61a. The juice squeezing attachment 3 is further provided with a squeezed-juice receiving pan 62 adapted to receive and store the fruit juice squeezed by the juice squeezing body 57. This squeezed-juice receiving pan 62 is composed of a receiving plate portion 63 adapted to accommodate the filtering plate 61 therein and a reservoir portion 64 downwardly inflated at one end of the receiving plate portion 63. This reservoir portion 64 is formed in the shape (a -shape as viewed from the top) which surrounds the box-like work portion 5 in the housing under the condition that the receiving plate portion 63 is placed on the support body 33 of the work surface 7 substantially in the horizontal condition. Internally of the reservoir portion is projected a locating member 64a which comes into abutment with the side of the housing 4 to serve as a detent for the receiving plate portion 63. The receiving plate portion 63 is integrally formed on the upper surface approximately in a central portion thereof with a support cylinder 65 to be projected which has a hole 64a for passing the rotating shaft 60 therethrough. The fitting portion 59 is placed on the support cylinder 65. Under this condition, the filtering plate 61 is positioned within the receiving plate portion 63. The receiving plate portion 63 is formed in its undersurface with a plurality of place portions 66. These place portions 66 are formed at position opposed to the support body 33 under the condition that the hole 65a is opposed to the engaging hole 19 of the drive shaft 17 and the reservoir portion 64 is positioned at the side of the housing 4. The receiving plate portion 63 is further formed with a switch operating portion 67 as shown in FIG. 21. This switch operating portion 67 is directed at the locking recess portion 16 of the housing 4 under the condition that the receiving plate portion 63 is placed on the support body 33. This switch operating portion 67 has an inclined surface 67a wherein when the receiving plate portion 63 is forced down against the support spring 34 of the support means 31, the push button 28 may be depressed.

It should be noted that the aforementioned juice squeezing attachment could be designated as indicated by a reference character 3A in FIG. 1. This juice squeezing attachment 3A has a squeezed juice receiving pan 62A which is integrally provided on the lower end of a juice squeezing body 57A. Thus, this attachment 3A comprises an integral structure composed of the juice squeezing body 57A, the pan 62A and a rotating shaft 60A.

With the above described structure, in cutting out the lid of a can, the vertically holding portion 8 of the can opener body 1 is first placed, for example, on a table. In this condition, the work surface 7 of the housing 4 assumes a substantially vertical condition as shown in FIGS. 2 and 3. Then, the engaging shaft portion 37a of the rotating shaft 37 in the can opening attachment 2 is brought into engagement with the engaging hole 19 of the drive shaft 17 in the can opener body 1 as shown in FIGS. 4 and 5, and the bearing portion 36 is fitted into the support hole 10. At the same time, the mounting shaft 43 in the can opening attachment 2 is inserted into the large diameter hole portion 11a of the mounting hole 11. Afterwards, the can opening attachment 2 is slightly turned in a counterclockwise direction in FIG. 2 about the bearing portion 36 to move the small diameter portion 43a of the mounting shaft 43 to the small diameter hole portion 11b of the mounting hole 11.

Thereby the large diameter portion 43b of the mounting shaft 43 enters the notched hole 13 as shown in FIG. 11 to prevent movement of the mounting shaft 43 in a direction of the axis. At the same time, the engaging recess portion 46 of the mounting shaft 43 engages the stop portion 14 to prevent the can opening attachment 2 from being rotated in a clockwise direction in FIG. 2. The switch operating portion 47 in the can opening attachment 2 is catched on the push button 28 as shown in FIG. 14 (A). Further, the cutter 51 is positioned at a level lower than the upper end of the can feed gear 38.

Figure 15:
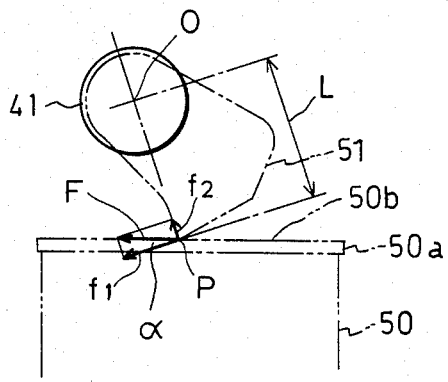
FIG. 15 illustrates the relation of a cutting-out exerting force.

Next, the switch operating portion 47 is pushed up by a finger of one hand as shown in FIG. 14 (B) to raise the cutter 51 to a level above the upper end of the can feed gear 38. In this condition, the can 50 to be cut out is gripped by the other hand to place the ear 50a of the can 50 on the can feed gear 38 and the upper edge of the ear 50a is brought into abutment with the can keep pin 53. Thereafter, pushing up of the switch operating portion 47 is released to bring the cutter 51 into abutment with the top of the can lid 50b internally of the ear 50a as shown in FIG. 14 (C). In this condition, the hand can be released from the can 50. The reason is that since the cutter 51 is positioned internally of the ear 50a, the ear 50a of the can 50 is held on the can feed gear 38 while being stayed thereon. Next, the switch operating portion 47 is pushed down as shown in FIG. 14 (D). Then, the lower end 49b of the plate spring 49 comes into abutment with the top of the ear 50a to urge the ear 50a against the can feed gear 38, after which the switch operating portion 47 presses the push button 28 to close the power source switch 30. Thereby the drive motor 21 is energized so that the can feed gear 38 is rotated in a direction as indicated by the arrow to rotate the can 50. The cutter 51 is pressed on the can lid 50b by the upper end 49a of the plate spring 49 upon pushing-down of the switch operating portion 47. Accordingly, the cutter 51 receives a force, which causes the cutter to be moved leftwards in FIG. 14 (D), due to the frictional force between the cutter and the lid 50b. This force constitutes a clockwise rotational moment about the pivot 41. By this rotational moment, the cutter 51 is cut into the can lib 50b to start cutting-out. This relation is shown in FIG. 15. Let O be the center of the pivot 41 and P be the contact point between the cutter 51 and the lid 50b of the can 50. Thrust F exerts on point P upon rotation of the can 50. However, point O is provided obliquely upwardly of the direction in which the can 50 is propelled, at a predermined angle with respect to point P. Therefore, said thrust F imparts a component of force f2 exerting towards point O and a component of force f1 acting downwardly at a right angle relative to a line which ties point O with point P. This component of force f1 is given by: $f1 = F \cos \alpha$, where $\alpha$ is the angle formed between thrust F and component of force f1. Moreover, the angle $\alpha$ is set in the relation of $f1 > f2$, and therefore, clockwise rotational moment in the form of $L \times F \cos \alpha$ is imparted to point P, where L is the length between point O and point P. Since the cutter 51 is cut into the lid 50b making use of the rotational moment resulting from rotation of the lid 50b as described above, the switch operating portion 47 need not be strongly pressed when cutting-in into the lid 50b is started. Next, the cutter 51 keeps receiving the aforesaid rotational moment during the cutting-out of the lid 50b. Accordingly, the cutter 51 keeps imparting the clockwise moment about the the pivot 41 in FIG. 14 (E) to the cutter operating plate 40 through the pin 48.

Thereby the switch operating portion 47 keeps depressing the push button 28, and even if the hand is released from the switch operating portion 47, the power source switch 30 remains closed to continue cutting-out of the lid 50b.

Thereafter, upon termination of cutting-out, the rotational moment of the cutter 51, which has been generated by rotation of the lid 50b, disappears and the aforesaid moment of the cutter operating plate 40 disappears accordingly. Thus, the cutter operating plate 40 is slightly rotated in a counterclockwise direction as shown in FIG. 14 (F) by the lower end 40b of the plate spring 49. Thereby the switch operating portion 47 is pushed up to release pushing-down of the push button 28 whereby the power source switch 30 opens to stop energization to the drive motor 21 and therefore the rotation of the can 50 stops. In this condition, the ear 50a of the can 50 is placed on the can feed gear 38 and the cutter 51 is positioned internally of the ear 50a, and therefore, the can 50 is not slipped out of the can opener.

Next, in removing the can, the can 50 is held by one hand, after which the switch operating portion 47 is pushed up to raise the cutter 51 from the upper end of the ear 50a of the can 50, and this condition, the can 50 is removed. Where the lid 50b is cut out in a manner as described above, there are features as follows: That is, the small diameter portion 11b in the mounting portion 11 is positioned on the side wherein the drive shaft 17 is rotated with respect to the large diameter portion 11a. Accordingly, the turning force of the drive shaft 17 acts so as to urge the mounting shaft 43 towards the small diameter portion 11b. Therefore, the mounting shaft 43 is not moved towards the large diameter portion 11a during the cutting-out of the can lid. Accordingly, it is possible to prevent a trouble in that the attachment 2 is disengaged from the body 1 during the cutting-out of the lid, resulting in a spillage of contents in the can.

Next, in the case the can lid of an extremely tall can is cut out, work can be done in the following manner. First, the can is placed on the table. Next, the grip 6 is gripped by hand and the can feed gear 38 is placed against the lower side of the ear of the can as shown in FIG. 14. Thereafter, the the switch operating portion 47 is operated in a manner as previously described to have the cutter cut into the can lid. If the operation is made as described above, after the cutter 51 has been positioned internally of the ear, the hand can be released from the grip 6. In this case, the can opener self-runs one round in the curcumference of the can to cut out the lid.

Next, in the case the can opening attachment 2 is removed from the can opener body 1, the can opening attachment 2 is rotated about the bearing portion 36 in a clockwise direction in FIG. 2 to move the mounting shaft 43 towards the large diameter hole portion 11a of the mounting hole 11. Under this condition, the mounting shaft 43 and the rotating shaft 37 are pulled out of the mounting hole 11 and the engaging hole 19, respectively, whereby the attachment 2 may be removed from the body 1. Thereby the can opening attachment 2 can be cleaned independently and with water.

Figure 13:
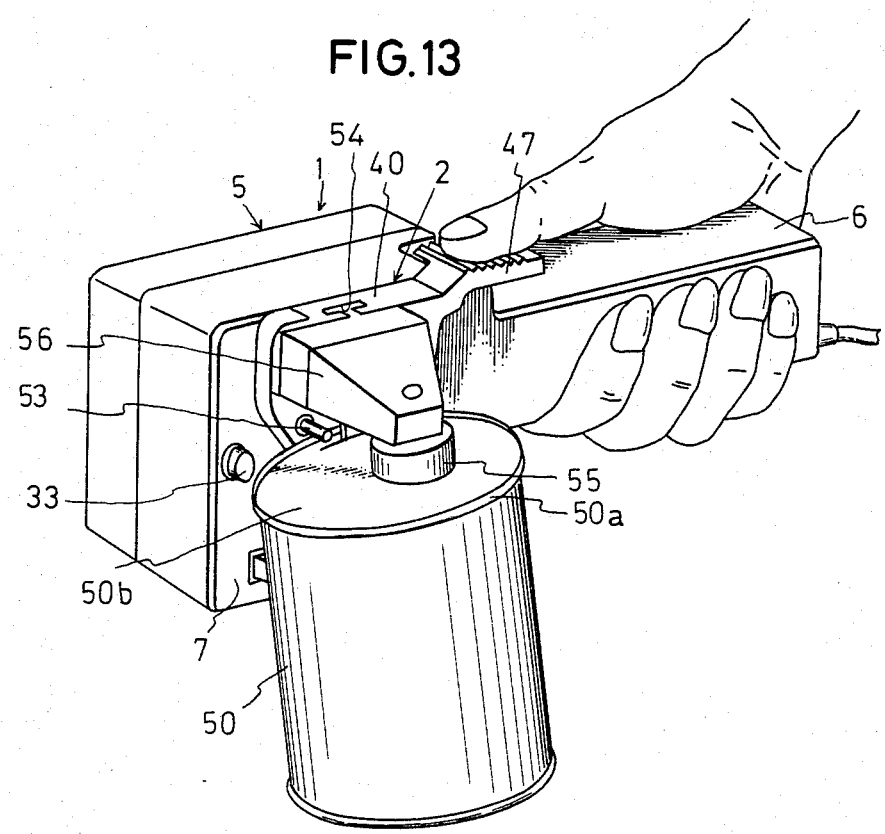
FIG. 13 is a perspective view showing cutting-out work of a can.
Figure 14A:
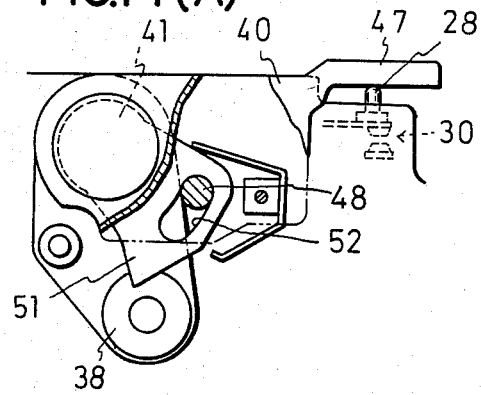
FIG. 14 (A) through (F) illustrate the order of can opening operation.
Figure 14D:
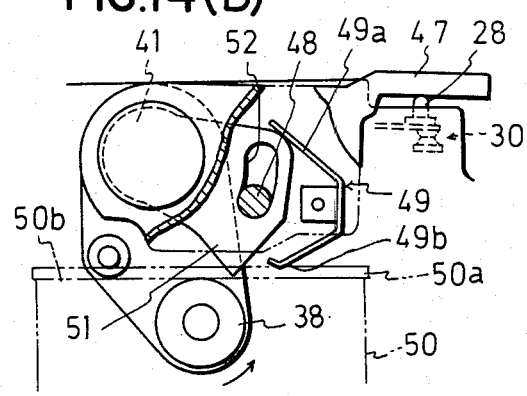
Figure 14B:
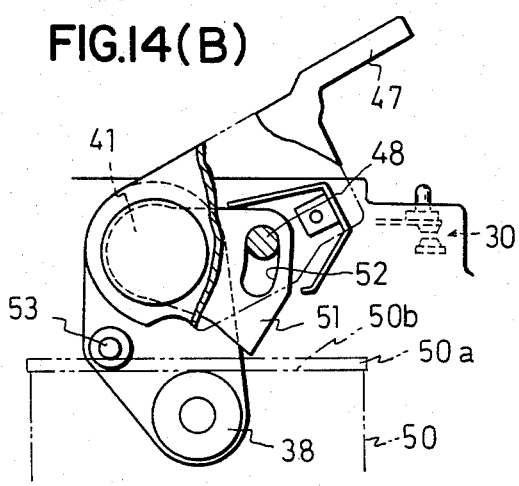
Figure 14E:
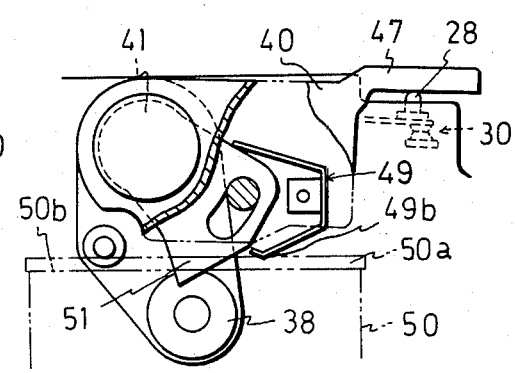
Figure 14C:
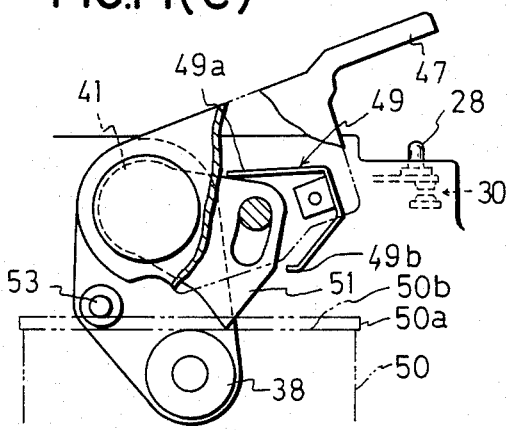
Figure 14F:
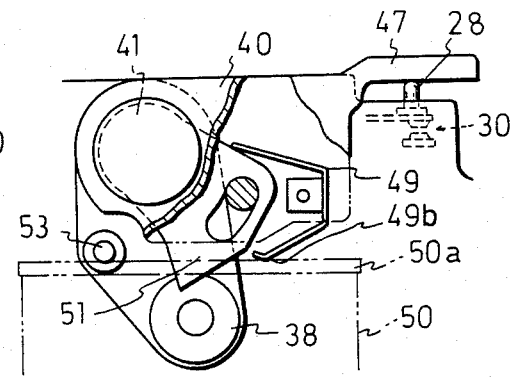

It will be noted that the cutting-out work can be also carried out under the condition that the grip 6 is gripped by one hand as shown in FIG. 13. In this case, the grip 6 serves as a horizontally holding portion for holding the work surface 7 in a vertical condition. Also, in this case, the operation of the switch operating portion 47 carried out as described above can be done by the thumb of a hand which has gripped the grip 6.

Figure 17:
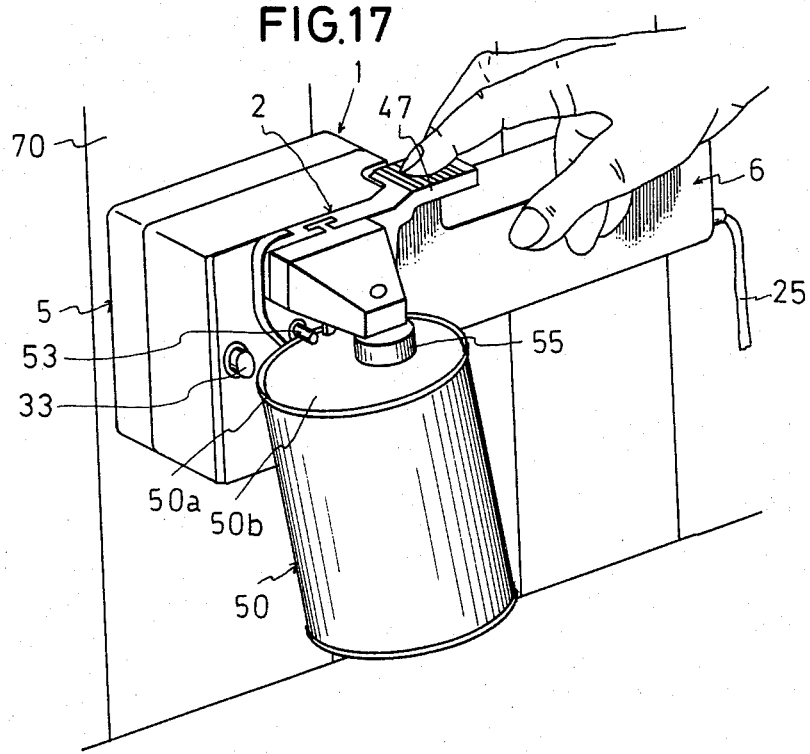
FIG. 17 is a perspective view showing a different example of use.

Alternatively, the cutting-out work can be carried out under the condition that hanging holes 72 of the can opener body 1 are hung on hanging bolts 71 of a wall 70 of a building to mount the electric can opener on the wall 70, as shown in FIGS. 16 through 18. Where the can opener is mounted on the wall surface as mentioned above, the back wall 5a serves as a vertically holding portion for holding the work surface 7 in a vertical condition.

Figure 20:
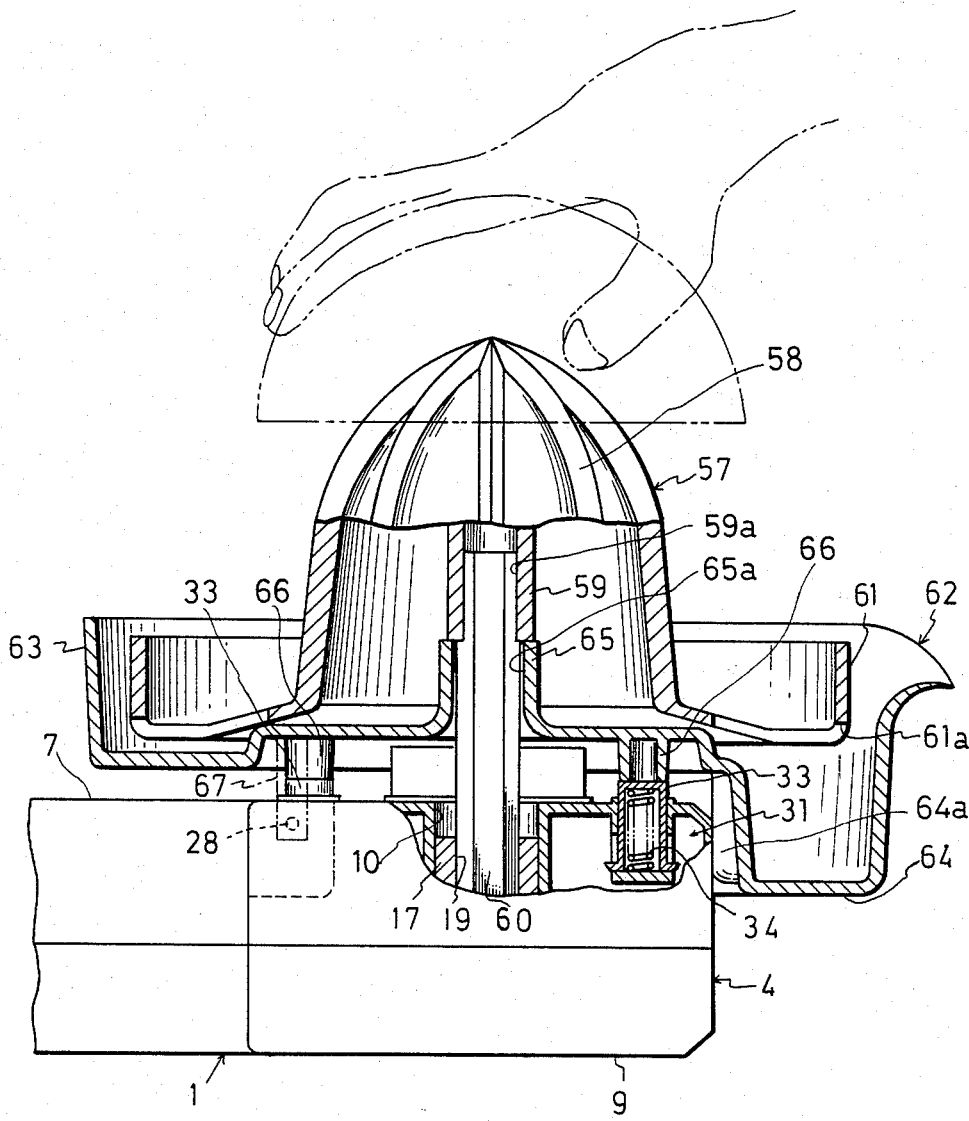
FIG. 20 is a front view showing the state of juice squeezing work with a part shown in section.

Next, in the case the citrus fruits such as lemon are squeezed, the horizontally holding portion 9 of the can opener body 1 is first placed on the table to make the work surface 7 in a substantially horizontal condition, as shown in FIG. 19. Then, place portions 66 of the juice squeezing attachment 3 are placed on the supports 33 and 33 of the work surface 7 as shown in FIG. 19. The locating member 64a provided internally of the reservoir 64 is brought into engagement with the side of the housing 4 to provide locating and detent of the pan 62 relative to the body 1. Next, after the rotating shaft 60 of the juice squeezing body 57 has been inserted into the hole 65a, the rotating shaft 60 is brought into engagement with the engaging hole 19 of the drive shaft 17, and the fitting portion 59 is placed on the support cylinder 65. Afterwards, the citrus fruits are pressed against the juice squeezing body 57 downwardly from the top. The juice squeezing body 57 and the squeezed juice receiving pan 62 are moved down as shown in FIGS. 20 and 21. (The support body 33 is moved down into the receiving recess portion 32.) Thereby, the inclined surface 67a of the switch operating portion 67 depresses the push button 28 to close the power source switch 30. Thereby the drive motor 21 is energized and the juice squeezing body 57 is rotated to squeeze the citrus fruits. Rotation of the juice squeezing body 57 continues during a period wherein the former is depressed. The thus squeezed fruit juice is filtered by the filtering plate 61, and thereafter, it stays in the reservoir 64 passing through the receiving plate portion 63 of the squeezed juice receiving pan 62. When the depression of the citrus fruits is released upon termination of the aforesaid juice-squeezing work, the juice squeezing body 57 and the squeezed juice receiving pan 62 are pushed up by the support spring 34. Thereby pressing of the push button 28 by the switch operating portion 67 is released to open the power source switch 30 and the rotation of the juice squeezing body 67 is stopped.

In the case the juice-squeezing is carried out in a manner as described above, the squeezed juice is filtered by the filtering plate 61. Accordingly, even if citrus fruits which tend to produce lees are squeezed, only the squeezed juice free from lees may enter the receiving pan 62. Accordingly, trouble of refiltering the thus obtained squeezed juice can be saved.

In the case of the aforementioned juice squeezing, the power source switch 30 is automatically closed as described above merely by pressing the citrus fruits against the juice squeezing body 57 and the power source switch 30 automatically opened merely by stopping such pressing. Accordingly, the squeezing work can be carried out simply by one hand alone.

Next, in the case the juice squeezing attachment 3 is removed from the can opener body 1, this can be accomplished by upwardly lifting the juice squeezing body 57 and the squeezed juice receiving pan 62 to pull out the rotating shaft 66 from the engaging hole 19. Thus, these parts can be cleaned independently with water.

Figure 22:
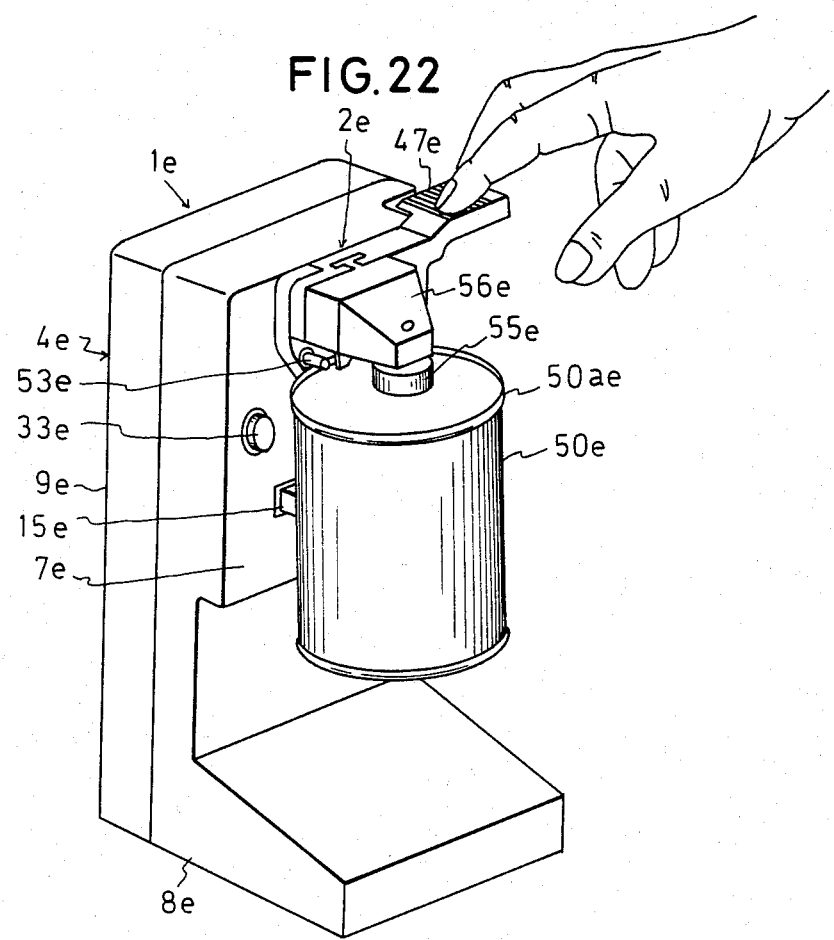
FIG. 22 is a perspective view a second embodiment of the can opener body.
Figure 23:
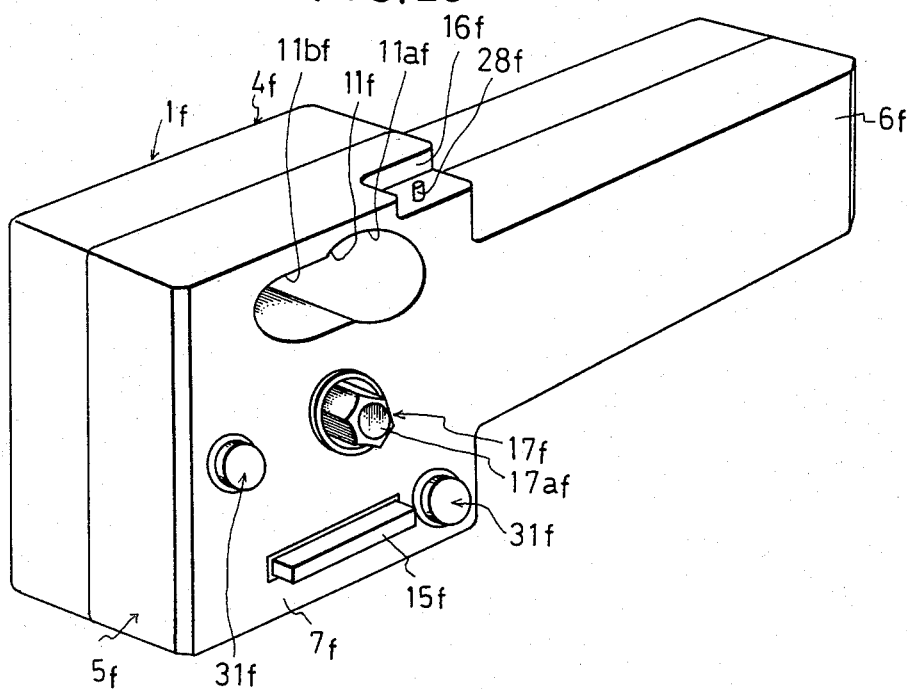
FIG. 23 is a perspective view showing a third embodiment of the can opener body.
Figure 24:
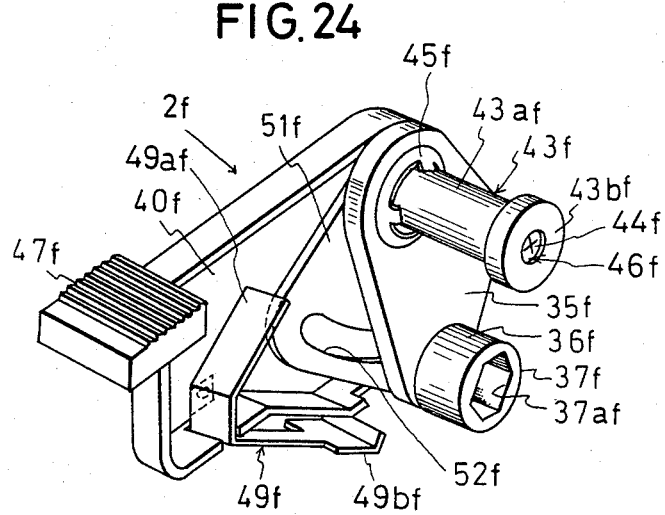
FIG. 24 is a perspective view of a can opening attachment mounted on the can opener body of FIG. 23 for use.
Figure 25:
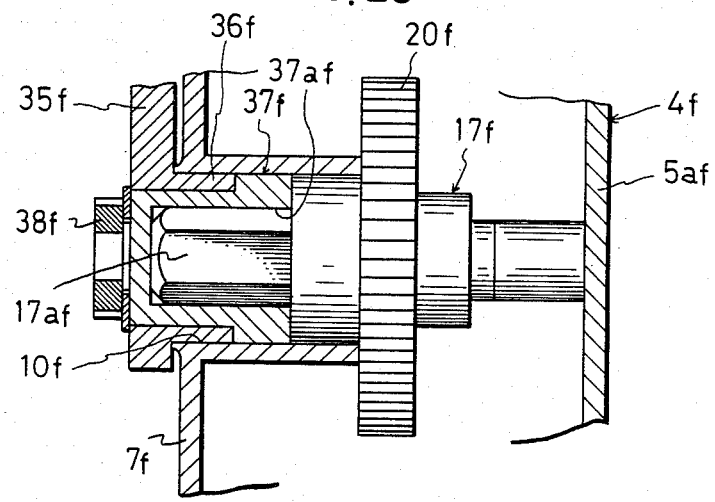
FIG. 25 is a sectional view showing the relation of a rotating shaft of the can opening attachment shown in FIG. 24 and a driving shaft of the body shown in FIG. 23.
Figure 26:
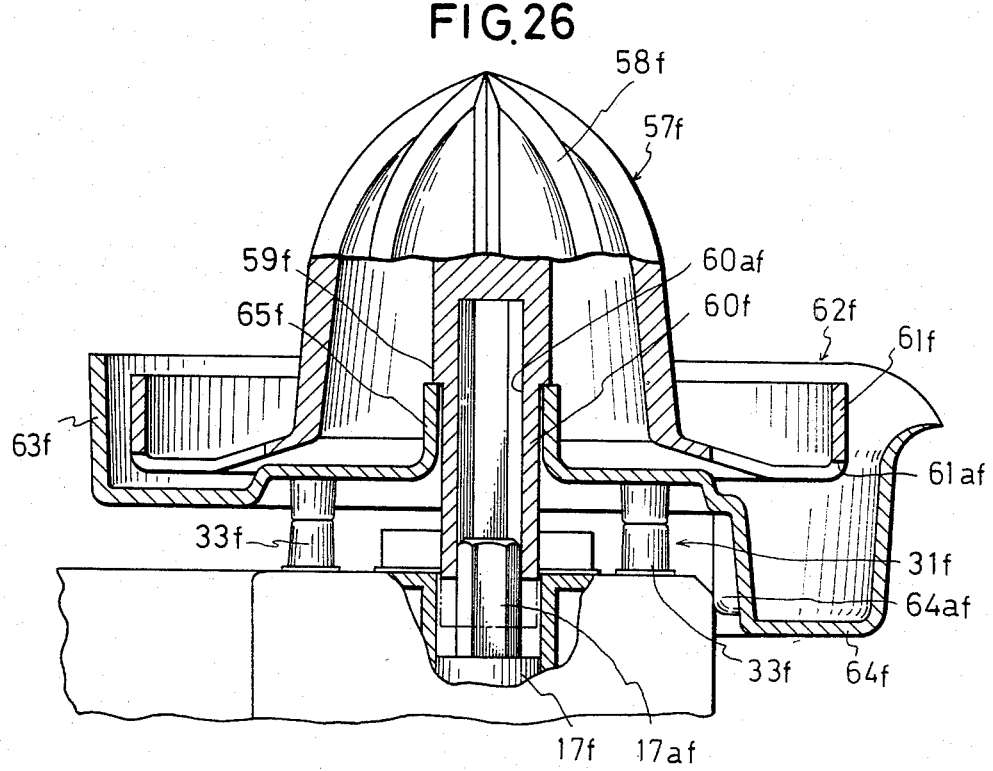
FIG. 26 is a front view, partly in section, showing a state wherein a juice squeezing attachment formed for the can opener body of FIG. 23 is mounted on the body of FIG. 23.

Next, FIG. 22 shows a different embodiment of the present application. FIG. 22 shows a placed type electric can opener. A housing 4e has a base 8e located at a lower portion thereof. This base 8e serves as a vertically holding portion for holding a work surface 7e in a vertical condition. When the base 8e is placed on the top surface of the table, the work surface 7e assumes a vertical condition at a higher position than the top surface of the table. Accordingly, in this condition, a can 50e can be cut out in a stabilized manner.

It is to be noted that parts in this embodiment considered to be identical with or equal in structure to those shown in the previous figures in terms of function have an alphabet "e" suffixed to the same reference numerals as those of the previous figures, and a duplicate description will not be made. (Also, in embodiments shown in the drawings after FIG. 22, an alphabet "f" is suffixed similarly, and a duplicate description will not be made.)

Next, FIGS. 23 through 26 show a can opener which is different in construction of an engaging portion between a drive shaft and a rotating shaft. That is, a drive shaft 17f of a body 1f is formed with an engaging shaft portion 17af. On the other hand, a rotating shaft 37f of a can opening attachment 2f and a rotating shaft 60f of a juice squeezing attachment 3f are formed with engaging holes 37af and 60af, respectively. The engaging hole 37af or 60af can be selectively brought into engagement with the engaging shaft portion 17af.

As many apparently widely different embodiments of this invention may be made without departing from the spirit and scope thereof, it is to be understood that the invention is not limited to the specific embodiments thereof except as defined in the appended claims.

What is claimed is:

1. An electric can opener including
    (i) a can opener body, and
    (ii) a can opening attachment
    said can opener body including
    (a) a housing having a work surface on one surface thereof,
    (b) a drive shaft mounted in such a way that the drive shaft is rotatable with respect to said housing, and is partly exposed to the work surface, wherein the work surface is bored with a mounting hole, said mounting hole including a large diameter hole portion and a small diameter hole portion formed laterally of and continuous to said large diameter hole portion, said small diameter hole portion being positioned, with respect to the large diameter hole portion, on the side where said drive shaft is rotated,
    (c) a motor provided within said housing and associated with said drive shaft,
    (d) a vertically holding portion for positioning said housing so that said drive shaft assumes a horizontal condition, said vertically holding portion being provided in a part of the housing, and
    said can opening attachment including
    (e) a base plate, a horizontal rotating shaft rotatably mounted on said base plate, a mounting shaft is projected from a surface of the base plate opposed to said work surface, and the distance from said horizontal rotating shaft to the mounting shaft is made equal to the distance from the drive shaft in said can opener body to said mounting hole, said mounting shaft including a small diameter portion on the base plate side and a large diameter portion on the forward end side thereof, said small diameter portion being reduced in diameter as compared with that of the small diameter hole portion so that the small diameter portion may be moved laterally towards the small diameter hole portion after the former has been passed through said large diameter hole portion, said large diameter portion being reduced in diameter as compared with that of said large diameter hole portion but increased in diameter as compared with that of said small diameter hole portion so that when said small diameter portion is moved laterally from the large diameter hole portion towards the small diameter hole portion, said large diameter portion is moved towards a deep portion of the small diameter hole portion to prevent the mounting shaft from being slipped out of the mounting hole, (f) a can feed gear mounted on said rotating shaft, said can feed gear being adapted to place an ear of a can thereon, and (g) a cutter slidably mounted on said base plate, said cutter being adapted to cut into a can lid of the can whose ear is placed on said can feed gear.

2. In an electric can opener according to claim 1, (a) a squeezed juice receiving pan, a juice squeezing attachment including (b) a verical rotating shaft provided on said squeezed juice receiving pan in such a way that said shaft extends through said pan, and (c) a juice squeezing body mounted on the upper end of said rotating shaft above said receiving pan, and (d) said drive shaft of said can opener body, said rotating shaft of said can opening attachment and said rotating shaft of said juice squeezing attachment being provided with an engaging portion which can connect the horizontal rotating shaft of the can opening attachment to the drive shaft when said drive shaft is placed in horizontal and which can connect the vertical rotating shaft of the juice squeezing attachment to the drive shaft when said drive shaft is placed in vertical.

3. An electric can opener according to claim 2, wherein said squeezed juice receiving pan in the juice squeezing attachment includes a receiving plate portion adapted to be placed on the work surface in said can opener body and a reservoir portion formed in such a way that the reservoir portion is inflated downwardly from a part of the receiving plate portion to surround a part of said can opener body from the side thereof, said vertical rotating shaft being rotatably extended through said receiving plate portion, and a filtering plate adapted to filter juice squeezed by the juice squeezing body is provided below said juice squeezing body.

4. An electric can opener according to claim 3, wherein the work surface of said can opener body is provided with a support means by which said squeezed juice receiving pan may be supported in the condition that the juice receiving pan can be moved up and down and can be resiliently moved down, a power source switch adapted to control rotation and stoppage of said motor is provided, in said can opener body, on a part of the portion surrounded by the reservoir portion in the squeezed juice receiving pan, said juice squeezing body in said juice squeezing attachment being capable of being rotated with respect to the squeezed juice receiving pan under the condition that said body is placed on the squeezed juice receiving pan, and a switch operating portion adapted to close said power source switch by downward movement of the squeezed juice receiving pan is provided, in the reservoir portion of said squeezed juice receiving pan, on the portion opposed to said power source switch, said engaging portion provided on the drive shaft of said can opener body and on the rotating shaft of said juice squeezing attachment being designed so that said rotating shaft may be moved axially with respect to said drive shaft.

* * * * *